3,010,917
CURING PROLAMINES
Doy W. Howland, La Grange, Ill., assignor to Corn Products Company, a corporation of Delaware
No Drawing. Filed Jan. 22, 1959, Ser. No. 788,258
10 Claims. (Cl. 260—6)

This invention relates to the curing of prolamines with epoxy resins, particularly the curing of zein and derivatives thereof with epoxy resins.

The main object of this invention is to produce a cured prolamine having improved properties, especially desirable for use in film applications. It is a further object of this invention to provide a method for producing films from prolamines which are tougher, more adhesive, more flexible, and more resistant to chemicals than those produced heretofore.

Tough, adherent, high-gloss films with good resistance to scuffing, greases and oils have been cast from solutions of zein. These films have been useful in the fields of coatings, adhesives, sealers and laminants, but they whiten in contact with water and have limited resistance to chemicals, especially alkalies and to materials in which they are soluble, e.g., aqueous alcohol, etc. In addition they are rather brittle. These disadvantages can be reduced by curing zein with such agents as formaldehyde. Films so cured have increased resistance to water and solvents but are still quite brittle. Plasticization of zein films has also been tried, but this method invariably causes a loss of other important properties in the films. Although the flexibility of such films may be increased by plasticization, qualities such as hardness or glossiness are often lost. None of these previous methods produced films from prolamines having all of the desired properties, i.e. toughness, adhesion, flexibility, and resistance to chemicals.

I have discovered that films having all these properties may be obtained by curing a suitable mixture of a prolamine or a prolamine derivative and an epoxy resin.

Prolamines that have formed superior films with epoxy resins are zein (the prolamine from corn) and derivatives thereof, such as partially deamidated zein and esters of zein with aliphatic alcohols; and kafirin (the prolamine from grain sorghum).

The prime requirement for the epoxy resins that may be employed in my invention is that they be compatible with the prolamine. The commercially available liquid epoxy resins having at least two epoxide groups per molecule of resin are most suitable. The preferred resins include the lower molecular weight products formed by interaction of para,para'-isopropylidenediphenol (sold by the Dow Chemical Company under the trade name Bis-Phenol-A) and epichlorohydrin, and reaction products of glycerin and epichlorohydrin. Examples of commercially available resins formed from para,para'-isopropylidenediphenol and epichlorohydrin are those sold under the trademarks Epon 820, Epon 828 (Shell Chemical Co.), Epi-Rez 504, Epi-Rez 510 (Jones-Dabney Co.), Araldite 502, Araldite 6005 (Ciba Co., Inc.), ERL 2774, ERL 2795 and ERL 3794 (Bakelite Co.). Examples of commercially available resins based on glycerin and epichlorohydrin are those sold under the trademarks Epon 562, Epi-Rez 5042 and Epi-Rez 5021.

The ratio by weight of epoxy resin to prolamine should be from about 5:95 to about 40:60. The ratio of epoxy resin to zein that has been found to yield films having optimum properties is from about 20:80 to about 30:70. The more compatible epoxy resins, such as the glycerin-epichlorohydrin resin may be used in higher ratios of resin to zein, such as 40:60, but properties of the films formed therefrom are deproved. Use of lower ratios of resin to zein, such as 10:90 result in improved products but their resistance to chemical attack is less than when the preferred ratios are employed. However, even as little as 5 percent of an epoxy resin improves the properties of zein films, especially their flexibility and adhesion.

A wide variety of solvents may be used for preparing solutions of zein and epoxy resins. Typical zein solvents such as aqueous alcohols and the glycols are particularly useful. The use of secondary solvents such as butyl alcohol or diluents, such as toluene, increases the compatibility of the solution with epoxy resins.

Aqueous dispersions have also been found useful. In this case the zein or zein derivative is dispersed in aqueous alkali and the epoxy resin added thereto. If the resin is insoluble, it is suspended in the dispersion by passage through a homogenizer. In certain cases it is advantageous to add a surface active compound to the aqueous dispersion.

Prolamine epoxy resin systems should be cured by heat. Cure at room temperature is very slow and does not produce films having the desired properties. By baking at temperatures of 145° C. to 200° C. for 30 to 5 minutes, respectively, well cured films are obtained.

Compounds may be added to the zein-epoxy resin systems to speed the rate of cure; however, under certain conditions these compounds do not yield films having optimum properties. The most useful class of compounds is the amines, but boron trifluoride compounds are also useful. Tertiary amines such as tridimethylaminomethylphenol, act as catalysts. Primary and secondary amines such as ethylene diamine, speed the rate of cure and at the same time enter into reaction with the epoxide groups. Thus additional amounts of resin must be added to compensate for this.

The reaction which occurs on curing of prolamines with epoxy resins has not been studied. Epoxide groups will react with many groups containing active hydrogen. Zein, the prolamine that has been most extensively used, contains many such active groups. Assuming a molecular weight of about 25,000 for zein, there are 8 phenolic and 24 aliphatic hydroxyl groups along the chain any of which may react with epoxide groups. It is assumed that one of the epoxide groups in a molecule of resin reacts with a hydroxyl group in one molecule of zein and that another epoxide group in the same molecule of resin reacts with a hydroxyl group in another molecule of zein, thus cross-linking the zein molecules.

The usual commercial liquid epoxy resins will contain about 0.5 epoxide equivalents per 100 gram of resin. Thus at a 20:80 epoxy resin to zein ratio, there are about 32 equivalents of added epoxide per molecule of zein (25,000). Thus, there are potentially many cross-links between the zein molecules.

In the preferred method for carrying out the invention a solution of zein and a liquid epoxy resin, preferably a resin formed from the reaction of para,para'-isopropylidenediphenol and epichlorohydrin, is prepared in a solvent medium, preferably 85 percent aqueous ethanol. The ratio by weight of epoxy resin to zein should be from about 20:80 to about 30:70. This solution is then applied to a surface, and the thus formed film is baked at temperatures of 145° C. to 200° C. for 30 to 5 minutes, respectively.

The films prepared in accordance with this invention were found to be insoluble in ordinary zein solvents and unaffected by several weeks of immersion in water. Such films were stable several days in 10 percent hydrochloric acid and over an hour in 2 percent sodium hydroxide. They also were very hard and had excellent adhesion to glass and such metal surfaces as tin and stainless steel. Adhesion and continuity of the films were maintained on tin plates even when tin was bent severely, as in the forming of tin cans.

The properties of the cured films from zein-epoxy resin systems as described herein should make them useful in coatings, particularly on metal and glass, in adhesives and in molding. Epoxy resins may also serve as curing agents for zein to be used in fibers or cork binding.

The following examples which are intended as typical and informative only and not in a limiting sense, will further illustrate this invention.

EXAMPLE 1

Film forming solutions were prepared by dissolving zein and epoxy resins in 85 percent aqueous ethanol at 30 percent solutes concentration. Films were cast, usually on clean stainless steel, with Bird film applicators at 0.003- to 0.012-inch wet thickness. After air drying, the films were baked to effect the cure. Film composition and curing conditions are given in Table 1.

*Table 1*

COMPOSITION OF ZEIN-EPOXY RESIN SYSTEMS AND CONDITIONS USED TO CURE FILMS

| | Composition (percentages by weight) | | Baking Conditions | |
|---|---|---|---|---|
| | Resin | Zein | Temperature, °C. | Time, minutes |
| A | 9.1% Epon 562 | 90.9% Zein | 145 | 120 |
| B | 16.7% Epon 562 | 83.3% Zein | 145 | 120 |
| C | 9.1% Epon 562 | 90.9% Deamidated Zein. | 145 | 120 |
| D | 16.7% Epon 562 | 83.3% Deamidated Zein. | 145 | 120 |
| E | 4.8% Epon 562 | 95.2% Zein ester | 145 | 60 |
| F | 9.1% Epon 562 | 90.9% Zein ester | 145 | 60 |
| G | 16.7% Epon 562 | 83.3% Zein ester | 145 | 60 |
| H | 9.1% Epon 815 | 90.9% Zein | 145 | 30 |
| I | 20% ERL 2774 | 80% Zein | 170 | 15 |
| J | 20% Araldite 502 | 80% Zein | 170 | 15 |

The cured films were tested by rubbing them with a cloth wet with 70 percent aqueous ethanol and by allowing drops of water, dilute aqueous ammonia (1 to 3 percent NH$_3$) and dilute acetic acid (or vinegar) to evaporate on the film surface. An ordinary zein film tested in such a manner dissolved in 70 percent ethanol and whitened in contact with water, aqueous ammonia or aqueous acetic acid.

All the films of Table 1 were essentially insoluble in 70 percent aqueous ethanol and nonblushing (did not whiten) in contact with water. The films were very lightly marked by aqueous ammonia or acetic acid.

Examples 2 and 3 illustrate the resistance of zein-epoxy resin cured films to aqueous solutions.

EXAMPLE 2

A solution was prepared from 4.0 grams of butyl ester of partially deamidated zein, 0.4 gram of Epon 828 resin, 8.0 grams of toluene and 8.0 grams of 95 percent aqueous ethanol. The bottom outside portions of several test tubes were coated with this solution by dipping the test tubes into the solution. The coated test tubes were dried overnight then baked at 145° C. for 30 minutes. The resulting baked films were immersed in 1 percent aqueous "Tide" detergent. After four days in the "Tide" solution the film was essentially unaffected.

EXAMPLE 3

Solution and films were prepared as in Example 2 except that 0.8 gram of Epon 828 resin was used. The results of the test were the same as in Example 2.

Examples 4 and 5 illustrate the use of a solution of zein-epoxy resin as a vehicle for pigments. Zein is an excellent binder for pigments.

EXAMPLE 4

A solution was prepared containing 40 grams of zein and 10 grams of Epon 562 resin in 150 grams of 85 percent aqueous ethanol. To this solution 108 grams of a titanium dioxide pigment were added. This mixture was ground in a ball mill for 5 hours. The resultant dispersion was laid on glass and stainless steel plates to form films of 0.003-, 0.006- and 0.012-inch thickness. Some of the films were baked 30 minutes at 145° C. and some at 170° C. for 15 minutes. All of the baked films were slightly yellow but essentially insoluble in 70 percent ethanol. These films had about the same resistance to scratching as the white enamel finish on the door of the laboratory refrigerator.

EXAMPLE 5

A dispersion was prepared as in Example 4 except that this time 65 grams of titanium dioxide pigment were added. Films of this dispersion were laid and baked as in Example 4. The cured films had about the same resistance to aqueous ethanol and scratching as the films in the previous example. When a second film was cast on the first film and baked as before, the adhesion was excellent.

Example 6 illustrates the preparation of zein-epoxy resin films formed from aqueous dispersions. Such dispersions would be much cheaper because of the saving in solvent costs.

EXAMPLE 6

Dispersions were prepared as follows:

A. 9 grams of deamidated zein, 1 gram of Epon 562 resin, 54.5 grams of water, and 2.2 grams of concentrated aqueous ammonia.

B. 8 grams of deamidated zein, 2 grams of Epon 562 resin, 54.5 grams of water, and 2.2 grams of concentrated aqueous ammonia.

Films of these two dispersions were spread on a clean stainless steel plate with a 0.006 inch clearance Bird film applicator. The films were left to dry over the weekend. The films were then baked at 145° C. for 30 minutes and cooled. The baked films from both dispersions were essentially insoluble in 70 percent ethanol and only slightly marked when drops of water, 3 percent aqueous ammonia or vinegar were allowed to evaporate from their surfaces.

Example 7 illustrates the preparation of stable aqueous emulsions from a dispersion of zein and a water insoluble epoxy resin. Such emulsions might be used to prepare films, fibers or molding powders for thermosetting plastics.

EXAMPLE 7

A dispersion of zein in aqueous sodium hydroxide was prepared using 72 grams of zein, 1.15 grams of sodium hydroxide and water to make a total of 400 grams. Then 8 grams of Epon 820 resin was homogenized into the dispersion until the size of the particles of resin in the resulting emulsion was 2 microns or less. The size of these particles did not change on aging of the emulsion at either 46° C. or at room temperature. These emulsions gelled at approximately the same rate as the original zein dispersion.

Films from this emulsion were spread on glass and dipped in 1 percent aqueous sulfuric acid. The resultant opaque film was then washed in water and dried at 65° C. During the drying the film became transparent. This film when baked at 150° C. for 30 minutes was insoluble in 70 percent aqueous ethanol.

The zein-epoxy resin was precipitated from this emulsion by diluting and acidifying with sulfuric acid. The slurry was adjusted to pH 7 and the zein-epoxy resin was filtered, washed with cold water and lyophilized. The dry zein-epoxy resin resembled ordinary zein in appearance. The dry zein-epoxy resin was powdered, and a portion of this powder was held in a mold at 150° C. under 4200 pounds per square inch of pressure for 30 minutes. The resultant dark brown, clear button was insoluble in aqueous alcohol and nonblushing in water.

Example 8 illustrates the use of baked zein-epoxy resin films to coat the interior of tin cans for food container use. Such formulations must have certain solvent evaporation characteristics. The solvent must have a low evaporation rate at room temperature and must also evaporate completely at the baking temperature to leave a continuous, flexible and resistant film. These solvent characteristics were obtained by use of the mixed solvent systems set forth below under Formulas A and B.

EXAMPLE 8

Two solutions were prepared as follows:

| Ingredient | Percent By Weight of Ingredient | |
|---|---|---|
| | A | B |
| Zein | 20.5 | 19.0 |
| Epon 820 resin | 4.9 | 7.8 |
| Propylene Glycol | 24.3 | 22.6 |
| Isobutyl Alcohol | 15.8 | 18.4 |
| Isopropyl Alcohol | 15.7 | 18.4 |
| Water | 18.8 | 13.8 |

The impurities were removed from these solutions by filtering, and the filtrates were aged over a weekend. Films were cast on large sheets of tin plate which were immediately passed through a continuous baking oven. The tin sheets were in the oven 15 minutes and were heated to a maximum of about 200° C. After cooling, can parts were cut and formed from the coated tin. Films from both solutions had good adhesion and continuity even on sharp bends. Sample pieces of baked coatings from both solutions were immersed in water. Neither film (from A or B) was affected by immersion in water for over 3 months.

Example 9 illustrates the use of zein-epoxy resin combinations as adhesives.

EXAMPLE 9

A solution was prepared of 6 grams of Epon 820 resin, 24 grams of zein and 85 percent aqueous ethanol to make a total of 100 grams. Portions of two pieces of ¼-inch thick fir plywood were coated with this solution. After drying overnight, a second coating was applied to each coated surface. The two pieces were then contacted so the wet surfaces were together and held so under pressure in a 150° C. oven for 35 minutes. After cooling, an attempt was made to force the two pieces of wood apart. In many places the original pieces of wood were split or torn apart instead of the glue bond between the two pieces of wood being broken.

I claim:

1. Process for preparing a tough, flexible, chemically resistant structure which comprises heating a non-alkaline mixture of a zein and a liquid epoxy resin having at least two epoxide groups per molecule of resin, within a temperature range of 145–200° C. for from 30 to 5 minutes, respectively, the ratio by weight of epoxy resin to zein in the said mixture being from about 5:95 to about 40:60.

2. A tough, flexible, chemically resistant structure formed by heating within a temperature range of about 145° C. to 200° C. a non-alkaline mixture of a zein and an epoxy resin having at least two epoxide groups per molecule of resin in a ratio of resin to zein of from about 5:95 to about 40:60.

3. Process for preparing cured films which are tough, adhesive, flexible, and resistant to chemicals which comprises preparing a non-alkaline mixture of a zein and a liquid epoxy resin having at least two epoxide groups per molecule of resin, forming films from said mixture, and curing said films at temperatures of 145 to 200° C. for 30 to 5 minutes, respectively; the ratio by weight of epoxy resin to zein in the uncured film being from about 5:95 to about 40:60.

4. Process according to claim 3, wherein said epoxy resin is the reaction product of para,para'-isopropylidenediphenol and epichlorohydrin.

5. Process according to claim 3, wherein said epoxy resin is the reaction product of glycerin and epichlorohydrin.

6. Process for preparing cured films which are tough, adhesive, flexible, and resistant to chemicals which comprises preparing a solution of zein and a liquid epoxy resin in a solvent medium, forming films from said solutions, and curing said films at temperatures of 145 to 200° C. for 30 to 5 minutes, respectively; the ratio by weight of epoxy resin to zein being from about 20:80 to about 30:70; and said epoxy resin being the reaction product of para,para'-isopropylidenediphenol and epichlorohydrin.

7. Heat cured films which are tough, adhesive, flexible, and resistant to chemicals comprising the reaction product of a zein and an epoxy resin having at least two epoxide groups per molecule of resin, the ratio by weight of resin to zein being from about 5:95 to about 40:60 and the curing temperature being in the range of 145 to 200° C.

8. Heat cured films according to claim 7, wherein said epoxy resin is the reaction product of para,para'-isopropylidenediphenol and epichlorohydrin.

9. Heat cured films according to claim 7, wherein said epoxy resin is the reaction product of glycerin and epichlorohydrin.

10. Heat cured films which are tough, adhesive, flexible, and resistant to chemicals comprising the reaction product of zein and para,para'-isopropylidenediphenol-epichlorohydrin, the ratio of resin to zein being from about 20:80 to about 30:70 and the curing temperature being in the range of 145 to 200° C.

References Cited in the file of this patent

UNITED STATES PATENTS

| 2,819,238 | Hart et al. | Jan. 7, 1958 |
| 2,882,250 | Baker | Apr. 14, 1959 |

OTHER REFERENCES

Zein, "The Paper Industry and Paper World," March 1946, pages 1810–16.